United States Patent [19]

Erlandsson

[11] Patent Number: 4,973,213
[45] Date of Patent: Nov. 27, 1990

[54] TRUCK ACTUATED VEHICLE RESTRAINT HAVING A PIVOTABLE INCLINED SURFACE

[75] Inventor: Kjell I. Erlandsson, Milwaukee, Wis.

[73] Assignee: Kelley Company Inc., Milwaukee, Wis.

[21] Appl. No.: 410,736

[22] Filed: Sep. 21, 1989

[51] Int. Cl.⁵ .............................................. B65G 67/02
[52] U.S. Cl. .................................... 414/401; 414/584
[58] Field of Search .................. 414/401, 584, 396; 14/71.1, 71.3; 292/169.11; 16/82, 83, 55

[56] References Cited

U.S. PATENT DOCUMENTS

| | | | |
|---|---|---|---|
| 2,693,284 | 11/1954 | Gerhardt | 414/584 |
| 4,127,857 | 11/1978 | Bickel | 340/687 |
| 4,148,498 | 4/1979 | Taylor, Jr. | 280/482 |
| 4,208,161 | 1/1980 | Hipp et al. | 414/401 |
| 4,264,259 | 4/1981 | Hipp | 414/401 |
| 4,267,748 | 5/1981 | Gruenewald et al. | 74/529 |
| 4,282,621 | 8/1981 | Anthony et al. | 14/71.1 |
| 4,373,847 | 2/1983 | Hipp et al. | 414/401 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,555,211 | 11/1985 | Metz | 414/401 |
| 4,560,315 | 12/1985 | Hahn | 414/401 |
| 4,589,813 | 5/1986 | Hagen et al. | 414/401 |
| 4,605,353 | 8/1966 | Hahn et al. | 414/401 |
| 4,630,989 | 12/1986 | Davey | 414/401 |
| 4,634,334 | 6/1987 | Hahn et al. | 414/401 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |

*Primary Examiner*—David A. Bucci
*Attorney, Agent, or Firm*—Andrus, Sceales, Starke & Sawall

[57] ABSTRACT

A vehicle restraint for preventing a vehicle, such as a truck, from accidentally pulling away from a loading dock during a loading operation. The vehicle restraint comprises a mounting frame mounted on the front vertical surface of the loading dock and a slide is mounted for movement on the mounting plate and is biased to an upper position. An inclined cam member is pivoted to the upper portion of the outer end of the slide and extends downwardly and outwardly from the slide and the lower end of the cam member is pivotally connected to the mounting frame via a link of fixed length. When a truck backs toward the loading dock, an abutment, such as an ICC bar, at the rear end of the truck, will engage the inclined cam member, wedging the slide downwardly against the force of the biasing member, and the ICC bar will engage a notch located in the upper edge of the slide to block outward movement of the truck from the loading dock. To release engagement of the ICC bar from the notch, a release bar is moved upwardly into engagement with the ICC bar, thereby driving the slide downwardly against the force of the biasing member to release the ICC bar and enable the truck to pull away from the dock.

11 Claims, 2 Drawing Sheets

TRUCK ACTUATED VEHICLE RESTRAINT HAVING A PIVOTABLE INCLINED SURFACE

BACKGROUND OF THE INVENTION

Vehicle restraints are employed to lock a truck or other vehicle to a loading dock to prevent the truck from accidentally pulling away from the dock during a loading operation.

U.S. Pat. No. 4,695,216 describes a vehicle restraint having a mounting plate which is mounted on the front vertical surface of the dock and a slide is mounted for sliding movement on the mounting plate. To guide the slide in movement, the slide carries two sets of vertically spaced rollers which ride on guide tracks on the dock face. The forward end of the slide is inclined, sloping downwardly and outwardly from the dock and the slide is biased to an upper position.

With the vehicle restraint of U.S. Pat. No. 4,695,216, an ICC bar of a truck will engage the inclined surface of the slide, wedging or camming the slide down against the biasing means and the ICC bar will then engage a recess or notch formed in the upper surface of the slide. Engagement of the ICC bar with the notch will prevent the truck from pulling away from the dock during the loading operation.

In the construction of U.S. Pat. No. 4,695,216 the ICC bar is released from the notch through use of a release bar that is mounted for movement relative to the slide. The release bar is moved upwardly against the ICC bar, thereby resulting in a downward force being applied to the slide which will move the slide downwardly against the force of the biasing means to release the ICC bar from engagement with the notch, thus enabling the truck to pull away from the dock.

The vehicle restraint of U.S. Pat. No. 4,695,216 also can incorporate an extension leg which is pivotally connected to the slide and forms an extension to the inclined surface of the slide. The leg is prevented from pivoting downwardly relative to the slide but can freely pivot upward. If a truck having a low ICC bar backs toward the dock, the ICC bar will initially engage the extension leg wedging the slide downwardly and the ICC bar will then ride upwardly along the inclined surface of the slide. As the ICC bar rides against the inclined slide, the extension leg will be pivoted upwardly through the connection of a fixed link to the frame, thereby enabling the slide to continue to move downwardly until the ICC bar engages the notch in the upper edge of the slide. The use of the extension leg increases the operating range of the vehicle restraint for a slide of given vertical dimension.

In the typical truck actuated vehicle restraint in which the truck ICC bar engages a slide or carriage and wedges the slide downwardly, there is a substantial force exerted by the truck through the slide to the guide rollers. Because of the force, the guide rollers and bearings must be constructed of heavy stock and the two sets of guide rollers must be spaced a substantial distance apart. The increased spacing between the sets of rollers increases the vertical depth of the slide and thus reduces its operational range.

SUMMARY OF THE INVENTION

The invention is directed to a vehicle restraint and more particularly to a restraint which is an improvement to that described in U.S. Pat. No. 4,695,216.

In accordance with the invention the vehicle restraint includes a mounting plate mounted on the front face of the loading dock and a slide or carriage is mounted for vertical movement on the mounting plate and is biased to an upper position.

An inclined cam member is pivoted to the upper edge of the outer end of the slide and extends downwardly and outwardly from the slide. The lower end of the cam member is pivotally connected through a pair of arms to the lower end of the mounting plate adjacent to the driveway.

When a truck backs toward the loading dock the ICC bar will engage the cam member, wedging the slide downwardly against the force of the biasing means and simultaneously causing the cam member to be pivoted upwardly relative to the slide to progressively change the angle of the cam member relative to the horizontal.

Continued inward movement of the truck toward the loading dock will wedge the slide downwardly to a point where the ICC bar rides over the upper tip of the slide and onto the upper surface of a release bar. The release bar is then lowered, and as the release bar is lowered the biasing means will urge the slide upwardly to move a recess or notch in the upper surface of the slide into engagement with the ICC bar. The generally vertical surface bordering the recess will thus prevent the truck from pulling away from the dock during the loading operation.

After the loading operation has been completed, the ICC bar can be removed from the notch through operation of the release bar which is moved upwardly into engagement with the ICC bar, thus driving the slide downwardly against the force of the biasing means to release the ICC bar from the notch and enabling the truck to pull away from the dock.

The vehicle restraint of the invention is light weight and of simple construction. The external force applied by the truck to the cam member is transmitted to the slide at the pivotal connection between the cam member to the slide, which is a shorter horizontal distance from the dock face than in prior vehicle restraints, with the result that the load on the guide rollers for the slide is reduced.

As a further advantage, the angularity of the cam member is progressively decreased relative to the horizontal as the ICC bar engages the cam member and moves toward the loading dock. As the angularity decreases, the force on the cam member required to drive the slide down correspondingly decreases and this reduces the stress applied to the slide and the supporting guide rollers.

As the load on the rollers is decreased, the vertical distance between the two sets of rollers can be decreased which results in a slide of lesser vertical depth, thereby enabling the slide to move to a lower position and increasing the range of operability of the vehicle restraint.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
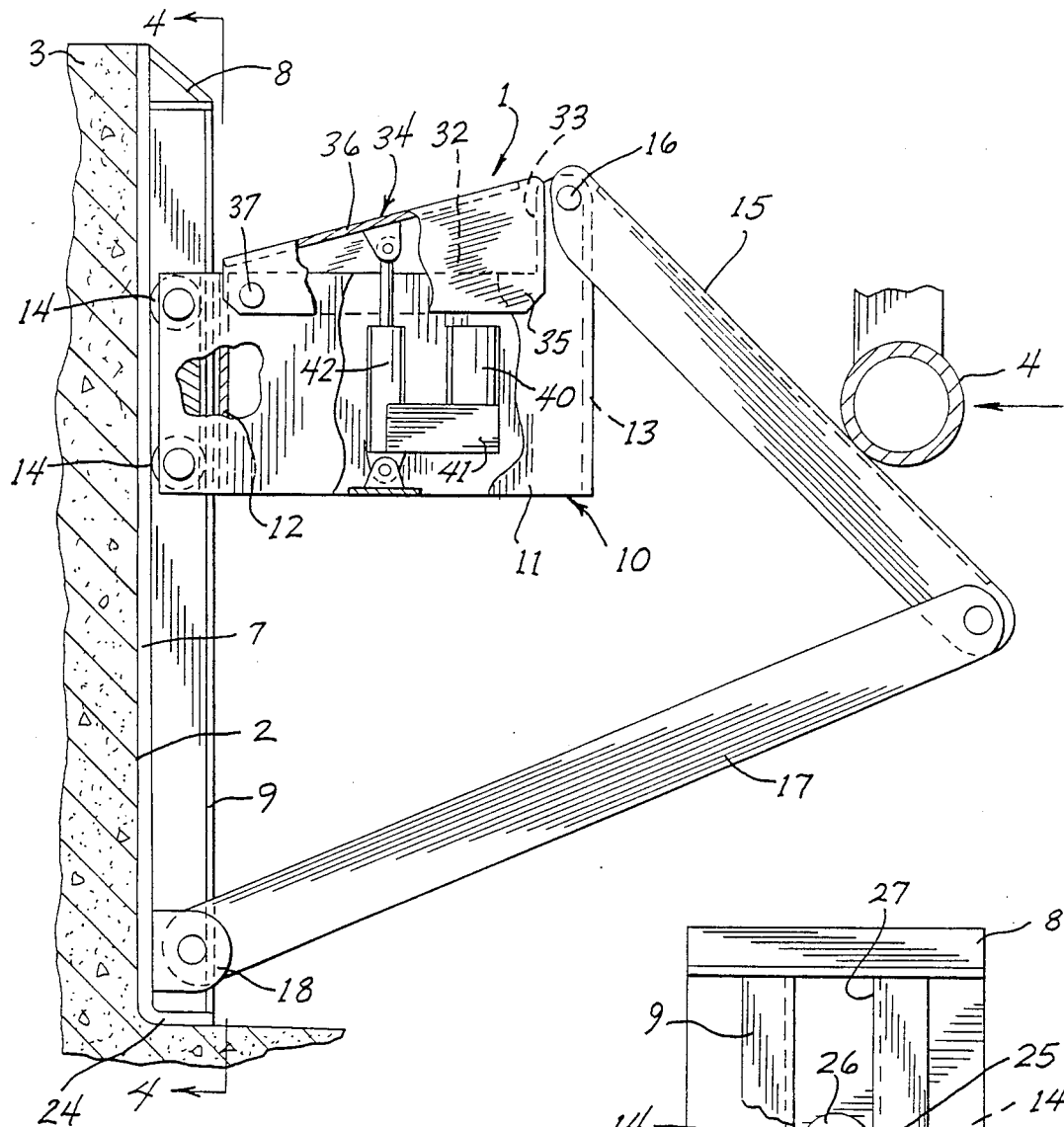
FIG. 1 is a side elevation of the vehicle restraint shown in the upper storage position with parts broken away in section.

The drawings show a vehicle restraint 1 mounted on the front face 2 of a loading dock 3 and adapted to engage an ICC bar 4 mounted at the rear end of a truck to prevent the truck from accidentally pulling away from the loading dock while a loading operation is in progress.

The ICC bar 4 is a horizontal bar or beam located at the rear of the truck beneath the truck bed and acts to prevent an automobile from underriding the truck in the event of a rear end collision. The cross sectional configuration, as well as the height of the ICC bar above the ground, may vary within prescribed limits.

In most installations the loading dock will also include a dock leveler, not shown, which is adapted to bridge the gap between the upper surface of the loading dock and the truck bed to enable material handling equipment to move between the dock and the truck bed.

Vehicle restraint 1 includes a mounting plate 7 which is secured to the front face of the dock through a series of conventional anchor bolts not shown. An angular weldment 8 is secured to the upper edge of the plate 7.

Figure 2:
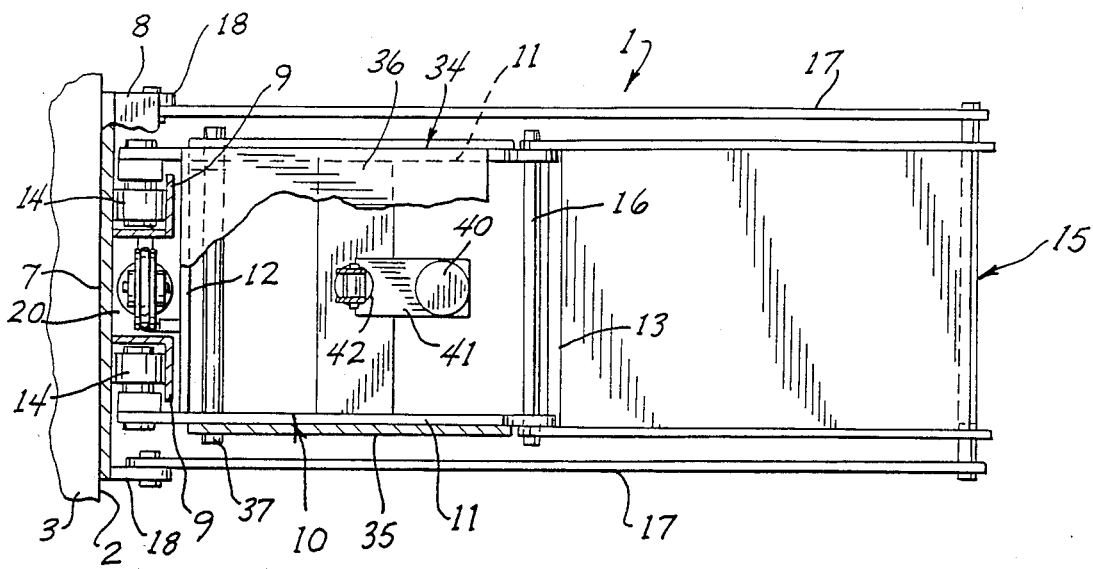
FIG. 2 is a top plan view of the vehicle restraint with parts broken away in section.

Secured to plate 7 is a pair of spaced angle shaped guide tracks 9 and a slide or carriage 10 is mounted for vertical movement on tracks 9. Carriage 10 includes a pair of side plates 11 which are connected by a cross plate 12 and an end plate 13. As best shown in FIG. 2, the inner ends of side plates 11 project inwardly toward dock 2 from cross plate 12 and a pair of vertically spaced rollers 14 are journaled on the projecting end of each side plates 11 and ride on tracks 9. Thus, the guide mechanism includes an upper set of rollers 14 and a lower set of rollers 14.

An inclined cam plate 15 is pivotally connected to the upper corner of slide 10 by shaft 16. Cam plate 15 has a width substantially the same as the width of slide 10 and extends downwardly from the upper edge of the slide an angle of about 45 degrees.

A pair of arms 17 of fixed length pivotally interconnect the lower end of the cam plate 15 with lugs 18 that extend outwardly from mounting plate 7.

Figure 4:
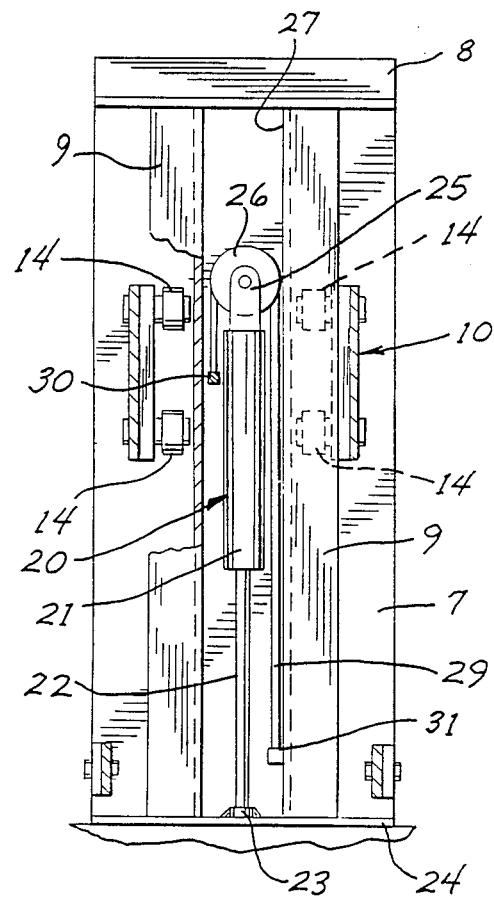
FIG. 4 is a section taken along line 4—4 of FIG. 1 and shows the biasing mechanism for the slide.

Slide 10 is biased to an upper position with respect to mounting plate 7 by a gas spring assembly 20. As best shown in FIG. 4, gas spring assembly 20 includes a cylinder 21 that contains a compressed gas, such as nitrogen, and a piston rod 22 extends outwardly from the lower end of cylinder 21 and is threaded in nut 23. Nut 23 is mounted on base plate 24 that projects outwardly from the lower end of mounting plate 7. The upper end of gas cylinder 21 carries a clevis 25 and a pulley 26 is journaled in clevis 25. Pulley 26 is adapted to move vertically in a track or channel 27 that is bordered by the outwardly projecting legs of angles 9.

A cable 29 is trained over pulley 26 and one end of cable 29 is secured to a lug 30 on slide 10, while the opposite end of the cable is deadened at 31.

The force of the gas spring assembly 20 will tend to extend the piston rod 22 and urge the slide 10 to an upper position relative to mounting plate 7. The use of the pulley 26 and cable 29 provides a 2:1 stroke of travel for slide 10 with respect to the stroke of piston rod 22. It is contemplated that other types of resilient members can be utilized to bias the slide to an upper storage position.

As the truck backs toward loading dock 3, the ICC bar 4 will engage the cam plate 15, thereby wedging the slide 10 downwardly against the force of the gas spring assembly 20 and simultaneously decreasing the angularity of the cam plate 15 with respect to the horizontal. Continued movement of the truck toward the loading dock will wedge the slide 10 down to a position where the ICC bar will ride over the upper outer tip of the slide and onto the upper inclined surface of a release member 34.

Figure 3:
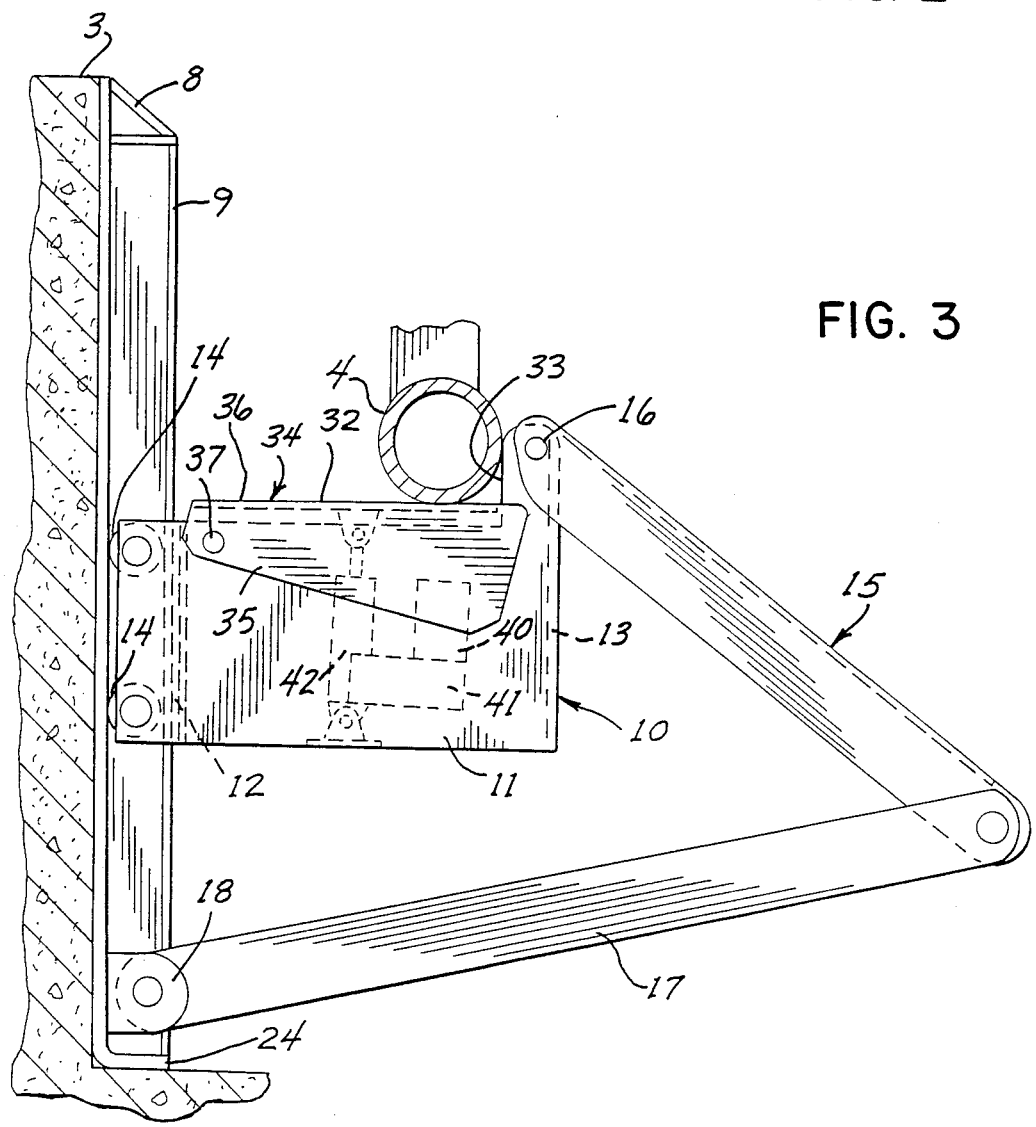
FIG. 3 is a side elevation of the vehicle restraint in the operative position.

Release member 34 is composed of a pair of spaced generally vertical side plates 35 which are connected by a top plate 36. Release member 34 is pivotally connected to the upper portion of slide 10 by a horizontal shaft 37 and is mounted for pivotal movement relative to a notch or recess 32 in the upper surface of slide 10 from an upper inclined release position, as shown in FIG. 1, to a lower generally horizontal hitch position as shown in FIG. 3. Notch 32 is outwardly bordered by a generally vertical surface or shoulder 33.

After the truck has backed to loading dock 3 and the ICC bar 4 has wedged slide 10 downwardly, release member 34 is pivoted downwardly to the generally horizontal position, and the biasing mechanism 20 will move the slide 10 upwardly to bring notch 32 into engagement with the ICC bar, thus blocking outward movement of the truck from the dock. A suitable sensing system, not shown, can be included which is actuated by downward pivotal movement of release member 34 to provide a signal on the loading dock indicating that the vehicle restraint is hitched with the ICC bar.

The release member 34 is power operated between the upper release position and the lower hitch position. In this regard, a reversible motor 40 and gear box 41 are mounted on slide 10 and the output shaft of the gear box drives a conventional linear actuator 42 which is operably connected to the lower surface of release member 34. Operation of motor 40 in one direction will drive actuator 42 downwardly to lower release member 34 to enable notch 32 to be biased into engagement with ICC bar 4, while operation of motor 40 in the reverse direction will drive actuator 42 upwardly causing an upward force to be exerted through member 34 against ICC bar 4, and as the ICC bar cannot move upwardly, a reactive force is exerted downwardly against slide 10 causing the slide to move downwardly against the force of gas spring assembly 20 to thereby disengage the ICC bar 4 from notch 32 and enable the truck to pull away from the loading dock. As the release member 34 at this time is locked against downward movement by the linear actuator 42, the truck can pull away from the dock, wedging the release bar 34 and slide 10 downwardly as the ICC bar passes over the upper end or tip of the cam plate 15. Alternately, the member 34 can be moved upwardly against ICC bar 4 to release the ICC bar by either a crank or toggle mechanism as described in U.S. Pat. No. 4,695,216.

The vehicle restraint of the invention provides distinct advantages in that the external force applied through the ICC bar 4 against cam plate 15 is transmitted through the shaft 16 to slide 10 regardless of the location of contact between the ICC bar and the cam plate. Thus the horizontal distance between the location of force transmission, i.e. shaft 16, and rollers 14 is less than in a vehicle restraint using a fixed cam plate where the horizontal distance between the location of force transmission and the guide rollers would be greater Because of this, a lesser load is applied to the rollers 14, or alternately, the vertical distance between the two sets of rollers can be decreased under the same load conditions. By decreasing the vertical distance between the two sets of rollers 14, the vertical depth of the slide can be reduced, thus enabling the slide to move to a lower position and increasing the overall range of the vehicle restraint.

As a further advantage, the cam plate 15 progressively changes in angularity as the ICC bar engages the cam plate and wedges the slide downwardly so that the lower end of the cam plate will not contact the driveway. As the angularity of cam plate 15 is decreased, the horizontal component of force required to depress the slide is correspondingly reduced and this decreases the stress on the slide as well as the supporting rollers and roller bearings.

Various modes of carrying out the invention are contemplated as being within the scope of the following claims particularly pointing out and distinctly claiming the subject matter which is regarded as the invention.

1. A vehicle restraint, comprising a frame mounted on a supporting structure, a slide mounted for vertical movement on said frame and having an inner end disposed adjacent said frame and having an outer end, said slide also having an upper surface, recess means disposed in the upper surface of said slide and disposed inwardly of said outer end, an inclined cam member having an upper end pivotally connected to the slide at a location adjacent the outer end of said upper surface, the pivotal connection of said cam member to said slide being disposed at a level above the bottom of said recess means, said cam member extending downwardly and outwardly from said slide at an angle to a horizontal plane, biasing means for urging the slide to an upper storage position, means for preventing pivotal movement of the lower end of said cam member in a direction toward said frame when said slide is in the upper position, an abutment on a vehicle backing toward said supporting structure disposed to engage said inclined cam member to wedge said slide downwardly against the force of said biasing means and affect engagement of said abutment with said recess means to thereby prevent said vehicle from pulling away from said supporting structure, and release means for releasing said abutment means from said recess means to enable said vehicle to pull away from the supporting structure.

2. The vehicle restraint of claim 1, wherein said means for preventing pivotal movement of the lower end of said cam member comprises a link of fixed length pivotally connecting the lower portion of said frame and the lower portion of said cam member.

3. The vehicle restraint of claim 1, and including means operable as a consequence of said abutment engaging said cam member for progressively decreasing the angularity of said cam member relative to the horizontal plane.

4. The vehicle restraint of claim 2, wherein said cam member has an inverted U-shape cross sectional configuration and includes a pair of side plates and a web connecting said side plates.

5. The vehicle restraint of claim 4, wherein corresponding ends of said side plates are disposed in lapping relation to the sides of said slide.

6. The vehicle restraint of claim 1, wherein said biasing means comprises a spring.

7. The vehicle restraint of claim 1, wherein said release means comprises a release member mounted in said recess means for movement between a lower position and an upper position, and actuating means for moving said release member from said lower position towards said upper position, movement of said release member towards said upper position creating an upward force against said abutment and a resulting downward force against said slide to move said slide downwardly and cause release of said abutment from said recess means.

8. A vehicle restraint, comprising a frame mounted on a supporting structure, a slide mounted for vertical movement on said frame, said slide having an upper surface and having an inner end disposed adjacent said frame and having an outer end, said slide also having an upper surface, a recess disposed in said upper surface, an inclined cam member extending downwardly and outwardly from said slide, means for pivotally connecting the upper end of said cam member to the outer end of said slide at a location above the level of the bottom of said recess, biasing means for urging the slide upwardly to a storage position, linkage means interconnecting the lower portion of said cam member with the lower portion of said frame, said linkage having a fixed length, an abutment on a vehicle backing toward said supporting structure disposed to engage said inclined cam member to wedge said slide downwardly against the force of said biasing means and affect engagement of said abutment with said recess to thereby prevent said vehicle from pulling away from said supporting structure, said cam member and said linkage being constructed and arranged such that the angularity of said cam member relative to a horizontal plane will progressively decrease as the slide is moved downwardly, and release means for releasing said abutment from said recess to enable said vehicle to pull away from the supporting structure.

9. The vehicle restraint of claim 8, wherein said cam member is disposed at an angle of about 45° to a horizontal plane when the slide is in the upper storage position.

10. The vehicle restraint of claim 8, wherein the outer end of said recess is bordered by a generally vertical shoulder.

11. A vehicle restraint, comprising a frame mounted on a supporting structure, a slide mounted for vertical movement on said frame and having an inner end disposed adjacent said frame and having an outer end, said slide also having an upper surface, recess means disposed in the upper surface of said slide and disposed inwardly of said outer end, an inclined cam member having an upper end pivotally connected to the slide at a location adjacent the outer end of said upper surface, the pivotal connection of said cam member to said slide being disposed at a level above the bottom of said recess means, said cam member extending downwardly and outwardly from said slide at an angle to a horizontal plane, the lower end of the cam member being disposed at a level beneath the lower extremity of said slide, biasing means for urging the slide to an upper storage position, means for preventing pivotal movement of the lower end of said cam member in a direction toward said frame when the slide is in said upper position, an abutment on a vehicle backing toward said supporting structure disposed to engage said inclined cam member to wedge said slide downwardly against the force of said biasing means and affect engagement of said abutment with said recess means to thereby prevent said vehicle from pulling away from said supporting structure, means responsive to downward movement of said slide from said upper position for progressively decreasing the angularity of said cam member relative to the horizontal, and release means for releasing said abutment means from said recess means to enable said vehicle to pull away from the supporting structure.

* * * * *